US011375580B1

(12) United States Patent
Marupaduga

(10) Patent No.: US 11,375,580 B1
(45) Date of Patent: Jun. 28, 2022

(54) MANAGING SECONDARY NODE AND CHANNEL ASSIGNMENT BASED ON WIRELESS DEVICE CHARACTERISTICS

(71) Applicant: Sprint Spectrum LP, Overland Park, KS (US)

(72) Inventor: Sreekar Marupaduga, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 6 days.

(21) Appl. No.: 17/029,210

(22) Filed: Sep. 23, 2020

(51) Int. Cl.
*H04W 88/06* (2009.01)
*H04W 24/10* (2009.01)
*H04B 17/336* (2015.01)
*H04B 17/318* (2015.01)
*H04W 76/15* (2018.01)

(52) U.S. Cl.
CPC .......... *H04W 88/06* (2013.01); *H04B 17/318* (2015.01); *H04B 17/336* (2015.01); *H04W 24/10* (2013.01); *H04W 76/15* (2018.02)

(58) Field of Classification Search
CPC . H04W 36/06; H04W 36/20; H04W 36/0066; H04W 36/32; H04W 68/00; H04W 74/002; H04W 24/10; H04W 36/0085; H04W 64/00; H04W 68/10; H04W 72/08
USPC .......... 455/436, 439, 63.3, 426.1, 462, 427, 455/422.1, 525, 67.11, 313, 437, 450, 455/466, 562.1, 562.2, 515; 370/335, 370/347, 320
See application file for complete search history.

(56) References Cited

U.S. PATENT DOCUMENTS

| 5,428,818 A * | 6/1995 | Meidan .................. H04W 36/20 455/67.11 |
| 5,596,333 A * | 1/1997 | Bruckert ............... H04W 64/00 455/562.1 |
| 5,678,187 A * | 10/1997 | Meidan .................. H04W 36/06 455/452.2 |
| 5,809,401 A * | 9/1998 | Meidan .................. H04W 36/06 455/446 |
| 5,870,673 A * | 2/1999 | Haartsen ............... H04W 68/00 455/574 |

(Continued)

FOREIGN PATENT DOCUMENTS

| EP | 2605600 A1 * | 6/2013 | ............ H04W 16/02 |
| WO | WO-2006124907 A2 * | 11/2006 | ........... H04B 17/318 |

OTHER PUBLICATIONS

B. Jabbari, R. Pickholtz and M. Norton, "Dynamic spectrum access and management [Dynamic Spectrum Management]," in IEEE Wireless Communications, vol. 17, No. 4, pp. 6-15, Aug. 2010, doi: 10.1109/MWC.2010.5547916. (Year: 2010).*

(Continued)

*Primary Examiner* — William D Cumming

(57) ABSTRACT

Systems and methods provide for assignment of wireless devices to a secondary node based on a characteristic of the wireless device and properties of the secondary node. The method may be triggered when noise reaches a predetermined threshold. HPUEs may be assigned to secondary nodes having a high reverse noise and channels having a high spectral efficiency and LPUEs may be assigned to secondary nodes having a lower reverse noise and a lower spectral efficiency.

13 Claims, 7 Drawing Sheets

(56) References Cited

U.S. PATENT DOCUMENTS

| | | | | |
|---|---|---|---|---|
| 5,914,944 A * | 6/1999 | Haugli | H04B 7/18513 | 370/320 |
| 5,940,765 A * | 8/1999 | Haartsen | H04B 7/2687 | 455/515 |
| 6,014,562 A * | 1/2000 | Weiss | H04W 74/002 | 370/347 |
| 6,526,279 B1 * | 2/2003 | Dent | H04W 36/0085 | 455/437 |
| 6,639,909 B1 * | 10/2003 | Sakuma | H04L 25/061 | 455/313 |
| 6,714,789 B1 * | 3/2004 | Oh | H04W 36/32 | 455/450 |
| 6,757,550 B1 * | 6/2004 | Yoneyama | H04W 48/20 | 455/437 |
| 7,146,176 B2 * | 12/2006 | McHenry | H04W 72/08 | 455/452.2 |
| 7,162,731 B2 * | 1/2007 | Reidhead | H04N 7/17309 | 348/192 |
| 7,391,755 B2 * | 6/2008 | Gopalakrishnan | H04B 7/061 | 370/341 |
| 7,570,948 B2 * | 8/2009 | Yoneyama | H04W 24/10 | 455/437 |
| 7,606,329 B2 * | 10/2009 | Yamauchi | H04B 17/318 | 375/316 |
| 7,633,901 B2 * | 12/2009 | Yuen | H04W 72/02 | 455/452.2 |
| 7,734,266 B2 * | 6/2010 | Billsberry | H03G 3/3068 | 455/245.2 |
| 7,792,547 B1 * | 9/2010 | Smith | H04W 72/046 | 375/267 |
| 7,991,422 B2 * | 8/2011 | Oroskar | H04W 52/50 | 455/418 |
| 8,009,778 B2 * | 8/2011 | Mielczarek | H04W 24/10 | 370/344 |
| RE43,066 E * | 1/2012 | McHenry | H04W 16/14 | 455/452.2 |
| 8,179,946 B2 * | 5/2012 | Roberts | H04B 1/7117 | 375/144 |
| 8,229,493 B1 * | 7/2012 | Oroskar | H04W 52/50 | 455/418 |
| 8,406,812 B2 * | 3/2013 | Smith | H04B 7/0408 | 375/267 |
| RE44,237 E * | 5/2013 | McHenry | H04W 16/14 | 455/452.2 |
| 8,514,910 B2 * | 8/2013 | Roberts | H04B 1/7117 | 375/148 |
| RE44,492 E * | 9/2013 | McHenry | H04W 16/14 | 455/67.11 |
| 8,611,908 B2 * | 12/2013 | Usuda | H04W 28/16 | 455/450 |
| 8,665,979 B2 * | 3/2014 | Mielczarek | H04W 24/10 | 375/267 |
| 8,868,095 B2 * | 10/2014 | Smith | H04B 7/0408 | 455/562.1 |
| RE45,302 E * | 12/2014 | McHenry | H04W 16/14 | 455/452.2 |
| RE46,905 E * | 6/2018 | McHenry | H04W 72/08 | |
| 10,015,070 B1 * | 7/2018 | Cai | H04W 36/00837 | |
| RE47,120 E * | 11/2018 | McHenry | H04W 16/14 | |
| 10,264,534 B1 * | 4/2019 | Park | H04W 52/265 | |
| 10,271,343 B2 * | 4/2019 | Behravan | H04W 72/0406 | |
| 10,790,872 B1 * | 9/2020 | Blanchard | H04B 7/0617 | |
| 10,834,685 B1 * | 11/2020 | Singh | H04W 52/245 | |
| 10,939,346 B1 * | 3/2021 | Park | H04W 72/0453 | |
| 11,057,882 B1 * | 7/2021 | Marupaduga | H04W 4/90 | |
| 2002/0002052 A1 * | 1/2002 | McHenry | H04W 72/08 | 455/446 |
| 2003/0149991 A1 * | 8/2003 | Reidhead | H04N 7/17309 | 725/127 |
| 2004/0062221 A1 * | 4/2004 | Gopalakrishnan | H04L 1/1867 | 370/335 |
| 2004/0162073 A1 * | 8/2004 | Yoneyama | H04W 72/0413 | 455/436 |
| 2005/0185737 A1 * | 8/2005 | Yamauchi | H04B 17/318 | 375/316 |
| 2005/0186962 A1 * | 8/2005 | Yoneyama | H04W 24/10 | 455/435.2 |
| 2006/0291401 A1 * | 12/2006 | Yuen | H04W 72/02 | 370/252 |
| 2007/0197179 A1 * | 8/2007 | Billsberry | H03G 3/3068 | 455/232.1 |
| 2007/0293257 A1 * | 12/2007 | Usuda | H04W 28/16 | 455/513 |
| 2009/0067529 A1 * | 3/2009 | Mielczarek | H04B 7/0641 | 375/267 |
| 2009/0141776 A1 * | 6/2009 | Roberts | H04B 1/7117 | 375/148 |
| 2010/0144295 A1 * | 6/2010 | Kroeger | H04B 1/18 | 455/193.1 |
| 2010/0178907 A1 * | 7/2010 | Oroskar | H04W 52/50 | 455/418 |
| 2010/0311469 A1 * | 12/2010 | Smith | H04B 7/0408 | 455/562.1 |
| 2011/0280324 A1 * | 11/2011 | Mielczarek | H04L 1/20 | 375/259 |
| 2012/0213252 A1 * | 8/2012 | Roberts | H04B 1/7117 | 375/E1.032 |
| 2013/0178223 A1 * | 7/2013 | Smith | H04W 72/046 | 455/450 |
| 2014/0247736 A1 * | 9/2014 | Mielczarek | H03M 13/612 | 370/252 |
| 2016/0192379 A1 * | 6/2016 | Behravan | H04W 72/0406 | 370/329 |
| 2019/0104549 A1 * | 4/2019 | Deng | H04W 24/08 | |
| 2019/0387409 A1 * | 12/2019 | Thangarasa | H04W 16/00 | |
| 2020/0037238 A1 | 1/2020 | Sundberg et al. | | |
| 2020/0053800 A1 * | 2/2020 | Deng | H04W 24/08 | |

OTHER PUBLICATIONS

"IEEE Recommended Practice for Local and Metropolitan Area Networks Coexistence of Fixed Broadband Wireless Access Systems," in IEEE Std 802.16.2-2004 (Revision of IEEE Std 802.16.2-2001), vol., no., pp. 1-166, Mar. 17, 2004, doi: 10.1109/IEEESTD.2004.94549. (Year: 2004).*

* cited by examiner

MANAGING SECONDARY NODE AND CHANNEL ASSIGNMENT BASED ON WIRELESS DEVICE CHARACTERISTICS

TECHNICAL BACKGROUND

A wireless network, such as a cellular network, can include an access node (e.g., base station) serving multiple wireless devices or user equipment (UE) in a geographical area covered by a radio frequency transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5G RATs (new radio (NR)). Deployment of the evolving RATs in a network provides numerous benefits. For example, newer RATs may provide additional resources to subscribers, faster communications speeds, and other advantages. However, newer technologies may also have limited range in comparison to existing technologies. To ensure consistent coverage through a wide geographic range, existing technologies such as 4G are often used in combination with newer technologies such as 5GNR.

When multiple RATs are used in combination, access nodes may utilize multiple channels having different frequency bands and/or transmission channels for deploying different RATs over a wireless air interface. Additionally, one access node transmitting over one channel may function as a master node having the capability to assign wireless devices to one of multiple secondary nodes transmitting over different channels and/or different RATs. The ability of the master node to assign wireless devices to secondary nodes can improve performance for the wireless devices.

Further, as UEs have evolved, in an effort to boost coverage and enhance throughput in wireless networks, higher power class User Equipment(s) (UEs) and/or wireless devices (HPUEs) have been proposed. HPUEs are capable of transmitting at a maximum allowable transmit power that is higher than lower power class UEs (LPUEs). As shown in Table 1 below, the maximum allowable transmit power for wireless devices can be defined by the power class of the wireless device.

TABLE 1

| Operating Band | Power Class 1 Wireless Device | | Power Class 2 Wireless Device | | Power Class 3 Wireless Device | | Power Class 4 Wireless Device | |
|---|---|---|---|---|---|---|---|---|
| | Power (dBm) | Tol. (dB) | Power (dBm) | Tol. (dB) | Power (dBm) | Tol. (dB) | Power (dBm) | Tol. (dB) |
| Band I | 31 | ±2 | 26 | ±2 | 23 | ±2 | 21 | ±2 |
| Band II | — | — | 26 | ±2 | 23 | ±2 | 21 | ±2 |
| Band II | — | — | — | — | 23 | ±2 | 21 | ±2 |

HPUEs generally fall into power classes 1 or 2, whereas LPUEs fall into power class 3 or 4. While a LPUE may not successfully transmit to an access node in a heavily loaded network, an HPUE in the same location may have sufficient transmit power to continue to transmit to the access node. Further, it should be noted that both HPUEs and LPUEs may have specific hardware capabilities such that their transmit power may be greater than or less than the transmit power specified above with respect to each of the power classes.

While HPUEs and LPUEs have different characteristics and capabilities, existing mobility management methods fail to adequately consider the transmission characteristics of the wireless device when assigning the wireless device to a particular secondary node or to a particular channel Accordingly, a solution is needed that utilizes wireless device characteristics to more proactively assist in making mobility decisions to transition wireless devices to a secondary node as appropriate to the particular characteristics of the wireless device.

Overview

Exemplary embodiments described herein include systems, methods, and processing nodes for assigning wireless devices to a secondary node based on wireless device characteristics. An exemplary method for assigning a wireless device to one of multiple secondary nodes includes identifying a characteristic of a wireless device in a sector, determining a noise level in the sector, and assigning the wireless device to one of the multiple secondary nodes based on the identified characteristic and the noise level in the sector.

An exemplary system is provided for assigning wireless devices to a secondary node based on wireless device characteristics is provided. The system includes at least one master node and multiple secondary nodes and a processor coupled to the master node configured to perform multiple operations. The operations include identifying a power class for at least one wireless device in a sector and classifying the wireless device as one of high-power class user equipment (HPUE) and low power class user equipment (LPUE). The operations additionally include determining a noise level in the sector and assigning the wireless device to one of the secondary nodes based on the wireless device classification and the noise level in the sector.

In a further exemplary embodiment, a processing node is configured to perform multiple operations. The processing node identifies a power class for at least one wireless device in a sector and classifies the wireless device as one of high-power class user equipment (HPUE) and low power class user equipment (LPUE). The operations of the processing node additionally include determining a noise level in the sector and assigning the HPUE to a channel based on a channel spectral efficiency when the noise level satisfies a predetermined threshold.

DETAILED DESCRIPTION

Figure 1:
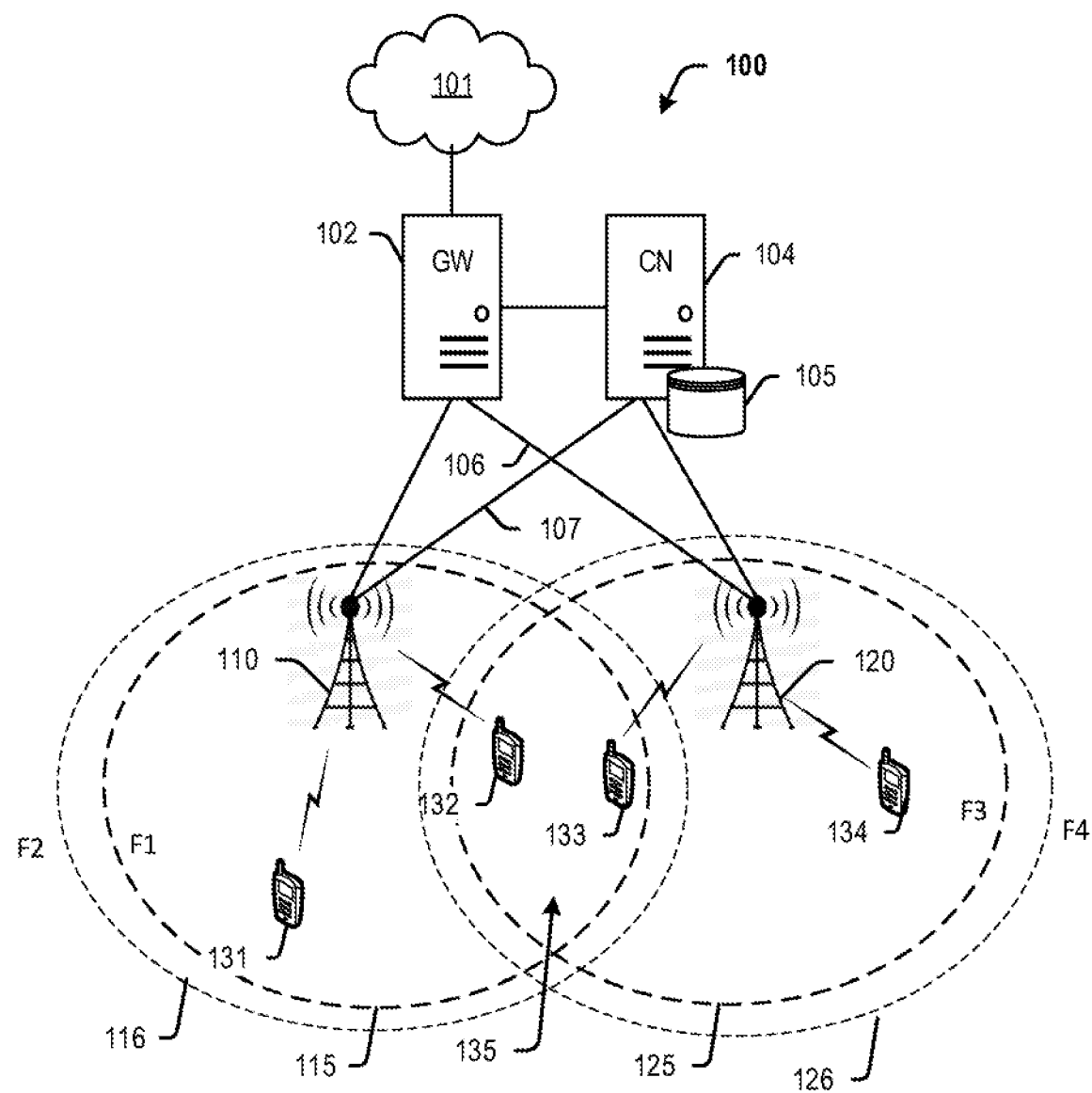
FIG. 1 depicts an exemplary system for wireless communication, in accordance with the disclosed embodiments.

Exemplary embodiments described herein include systems, methods, and processing nodes for assigning a wireless device to a secondary node in an EN-DC network based on characteristics of the wireless device. Thus, embodiments disclosed herein operate in networks utilizing an EN-DC architecture, which allows devices to access two different RATs, such as both LTE and 5G, simultaneously on the same channels or different channels encompassing various spectrum bands. Thus, a master node may assign a wireless device to a secondary node selected from multiple secondary nodes. The secondary nodes may, for example, transmit over a 5G RAT or a 4G RAT and may utilize different channels from one another for transmission.

In embodiments disclosed herein, a cell or wireless network may be provided by an access node. The access node may utilize one or more antennas to communicate with wireless devices or UEs. Performance at a particular wireless device may be dependent on a number of factors including, for example, antenna performance parameters, network loading conditions, (number of connected HPUEs and LPUEs) and wireless device location within a cell or a sector. Because certain network conditions are likely to result in poor performance of wireless devices in the network, embodiments provided herein perform a method for a master node within the network, to assign wireless devices to a secondary node or to a particular transmission channel utilized by a secondary node when noise within a sector satisfies a predetermined threshold. The assignment of the wireless device may be accomplished dynamically by a master node connected to multiple secondary nodes.

In embodiments set forth herein, the network may be 5G NR EN-DC network where one master node is connected to multiple secondary nodes and there are combination of HPUEs and LPUEs in the network. Further, the method may require that noise levels in a sector reach a satisfy a predetermined threshold prior to activation. Measurements of noise may include reverse link noise rise, uplink channel received power, and uplink interference levels. Factors may contribute to the noise, such as total loading on the sector, external interference, and total number of HPUEs and LPUEs in the sector, and number of UEs transmitting from a cell edge. Multiple measurement items, such as reference signal receive power (RSRP), reference signal received quality (RSRQ), and signal to interference and noise ratio (SINR), and received signal strength indicator (RSSI) may be included in the measurement reports from the wireless devices to a master access node. When noise in a sector satisfies a predetermined threshold, embodiments of the method dynamically determine HPUE and LPUE allocation to a specific secondary node based on channel received power (CRP) or reverse noise at each of the secondary nodes. The HPUE is assigned to a secondary node with a highest channel received power.

The assignment of HPUEs to the secondary node with the highest reverse noise, CRP or received noise level allows communication at a higher level. If a UE, such as an LPUE is not transmitting at a higher power, the secondary nodes may not be receiving the transmissions or be able to decode packets from LPUE when such high noise conditions exist. Embodiments described herein are particularly effective in high capacity areas, where a master access node transmitting over one RAT air interface may interact with multiple secondary nodes transmitting over a second RAT air interface. To achieve higher capacity, additional secondary nodes can be incorporated. Because HPUEs can transmit at higher power than LPUEs, the method assigns HPUEs to the secondary node where the reverse noise is the highest and LPUEs to the secondary nodes where the reverse noise level is the lowest.

In further exemplary embodiments, a master node determines the spectral efficiency of transmission channels utilized by the secondary nodes and dynamically assigns HPUEs to high spectral efficiency channels or bands. The spectral efficiency is a measure of the quantity of users or services that can simultaneously be supported by a limited radio frequency bandwidth in a defined geographic area. Spectral efficiency can be defined, for example, as the maximum aggregated throughput, i.e. summed over all users in the system, divided by the channel bandwidth and by the covered area. The assignment of HPUEs to the highest spectral efficiency channel ensures that HPUEs, which are contributing towards the high noise, are able to transmit more data in a short period of time, thus reducing the overall noise impact on the access nodes. In further exemplary embodiments, the method triggers when noise and/or loading in the sector reaches a predetermined threshold, for example, when the RSSI reaches a predetermined threshold level or when another measure of loading on the sector exceeds a predetermined threshold. The assignment of HPUEs to high spectral efficiency channels in a loaded sector is effective in facilitating quick transmission by the HPUEs in a loaded sector with high noise. Through execution of the method, HPUEs transmit quickly and LPUEs thus wait a shorter time to transmit.

In exemplary embodiments, a processor or processing node associated with an access node may determine whether a wireless device is a high power class wireless device or a low power class wireless device. In order to make this determination, access nodes may receive communications from wireless device such as HPUEs and LPUEs. For example, the HPUEs and LPUES can use a UE CAPABILITY message to indicate (or report) at to the access node that an HPUE is a power class 2 UE and/or wireless device that corresponds to a Power of +26 dBm (illustrated in Table 1) with a nominal power tolerance (i.e., power error limit) of ±2 dB (e.g., for E-UTRA bands). In addition, HPUEs or LPUEs can use power headroom report (PHR) and/or enhanced PHR (ePHR) message(s) to report a current transmit power state (e.g., how much power the HPUEs or LPUEs required in a previous subframe structure) to the AN. Alternatively, in another exemplary embodiment, HPUEs and LPUEs can be configured with a chipset type or version, which may be provided to the access node by the HPUEs or LPUEs during an ATTACH PROCEDURE. Other methods of communicating whether the UE is a HPUE or LPUE may be used in conjunction with the disclosed embodiments. Accordingly, a processor or processing node may determine if a wireless device interacting with the access node is an HPUE or an LPUE.

The processor or processing node is also programmed to identify when a predetermined noise threshold in the sector is satisfied for implementing embodiments of the method described herein. The noise level indicates the amount of background noise in a wireless environment. If the noise level is too high, it can result in degraded strength and performance for your wireless signal strength. The noise level can be measured in −dBm format (0 to −100). This is the power ratio in decibels (dB) of the measured power referenced to one milliwatt. The closer the value to 0, the greater the noise level. Negative values indicate less background noise. For example, −96 dBm is a lower noise level than −20 dBm. Further, various measurements may be evaluated to assess the noise level such as a number of UEs served by the sector, SINR, SNR, RSSI, or reference signal received quality (RSRQ).

When the access node, processor, or processing node identifies an HPUE and determines that noise satisfies the predetermined threshold, it may be programmed to assign the HPUE to a node having a channel having a highest spectral efficiency or to a secondary node having a highest reverse noise or CRP as set forth above. Further, the access node may assign LPUEs to a lowest spectral efficiency channel or node having a lowest reverse noise or CRP. Because HPUEs have a higher transmit power than LPUEs, they will transmit even faster, even when RF conditions are poor because of their higher power. LPUEs have a lower transmit power and therefore have difficult transmitting in poor RF conditions.

Therefore, in accordance with embodiments disclosed herein, methods and systems assign wireless devices to a secondary node and/or channel based on wireless device characteristics and a noise level in the sector. These steps may be performed in any order. Based on the wireless device characteristics and the existence of a loaded sector with high noise, the methods and system strategically assign the wireless devices to a secondary node or channel.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

The terms "transmit" and "transmission" in data communication may also encompass receive and receiving data. For example, "data transmission rate" may refer to a rate at which the data is transmitted by a wireless device and/or a rate at which the data is received by the wireless device.

An exemplary system described herein includes at least an access node (or base station), such as an eNodeB, a next generation NodeB (gNodeB), and a plurality of end-user wireless devices. For illustrative purposes and simplicity, the disclosed technology will be illustrated and discussed as being implemented in the communications between an access node (e.g., a base station) and a wireless device (e.g., an end-user wireless device). It is understood that the disclosed technology may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

In addition to the systems and methods described herein, the operations of assigning wireless devices to secondary nodes or channels based on wireless device characteristics and loading conditions may be implemented as computer-readable instructions or methods, and processing nodes on the network for executing the instructions or methods. The processing node may include a processor included in the access node or a processor included in any controller node in the wireless network that is coupled to the access node.

FIG. 1 depicts an exemplary system 100 for use in conjunction with embodiments disclosed herein. System 100 comprises a communication network 101, gateway 102, controller node 104, access nodes 110 and 120, and wireless devices 131, 132, 133, and 134. Access node 110 is illustrated as having a coverage area 115 associated with a first frequency band F1 and a coverage area 116 associated with a second frequency band F2. Thus, access node 110 is configured to deploy radio air interfaces utilizing a first frequency band F1 and a second frequency band F2. In this exemplary embodiment, access node 110 deploys a radio air interface utilizing frequency band F1 over a coverage area 115 and a radio air interface utilizing frequency band F2 over a coverage area 116. F1 may be used for transmission over one RAT air interface and F2 may be used for transmission over another RAT air interface.

Access node 120 is illustrated as having a coverage area 125 associated with frequency band F3 and a coverage area 126 associated with a frequency band F4. Thus, access node 120 deploys a radio air interface utilizing frequency band F3 over a coverage area 125 and a radio air interface utilizing frequency band F4 over a coverage area 126. F3 may be used for transmission over one RAT air interface and F4 may be used for transmission over another RAT air interface. Further, additional frequency bands and channels may exist in the coverage areas of access nodes 110 and 120. In either case, each access node 110, 120 can deploy one or more radio air interfaces that utilize one or more frequencies, enabling wireless communication with wireless devices 131, 132, 133, 134.

As shown herein, wireless devices 131, 132 attach to access node 110 via frequency bands F1 or F2. Similarly, wireless devices 133, 134 attach to access node 120 via frequency bands F3 or F4. Although access nodes 110, 120 and wireless devices 131, 132, 133, 134 are illustrated in FIG. 1, any number of access nodes and wireless devices can be implemented within system 100.

Wireless devices 131, 132, are located within coverage areas 115 and 116 and access network services from access node 110. Wireless device 133 and 134 are located within coverage areas 125 and 126 and access network services from access node 120. Further, wireless devices 132 and 133 are located within potential interference area 135 formed by an overlap of coverage areas 115, 116, 125, and 126.

Further, a scheduling entity (within, for example, one or both of access nodes 110, 120, or controller node 104) may be configured to allocate resources and provide mobility instructions, thereby improving performance in the sector when excessive noise is present or in undesirable area 135. For example, noise satisfying a threshold is found in the sector, the access nodes 110 and 120 may instruct the wireless devices 132 and 133 respectively to connect to a secondary node. In embodiments disclosed herein, one or more of access nodes 110, 120 may comprise logic for performing operations for evaluating sector noise, evaluating wireless device characteristics, determining CRP or reverse noise at each secondary node, and evaluating spectral efficiency at each secondary node channel. The logic may further facilitate selection of a secondary node for a selected wireless device.

Access nodes 110, 120 can be any network node configured to provide communication between wireless devices 130-134 and communication network 101, including standard access nodes and/or short range, low power, small access nodes. For instance, access nodes 110, 120 may include any standard access node, such as a macrocell access node, base transceiver station, a radio base station, next generation NodeBs (gNBs) in 5G networks, or enhanced eNodeBs (eNBs) in 4G/LTE networks, or the like. In an exemplary embodiment, a macrocell access node can have a coverage area 115, 125 in the range of approximately five kilometers to thirty five kilometers and an output power in the tens of watts. In other embodiments, access nodes 110, 120 can be a small access node including a microcell access node, a picocell access node, a femtocell access node, or the like such as a home NodeB or a home eNodeB device. Moreover, it is noted that while access nodes 110, 120 are illustrated in FIG. 1, any number of access nodes can be implemented within system 100.

Access nodes 110, 120 can comprise processors and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can receive instructions and other input at a user interface. Access nodes 110, 120 communicate with gateway node 102 and controller node 104 via communication links 106, 107. Access nodes 110, 120 may communicate with each other and with other access nodes (not shown) using a direct link such as an X2 link or similar.

Wireless devices 131-134 may be any device, system, combination of devices, or other such communication platform capable of communicating wirelessly with access nodes 110, 120 using one or more frequency bands deployed therefrom. Wireless devices 131-134 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120. As set forth above, the wireless devices can be HPUEs or LPUEs and in embodiments disclosed herein, are a combination of HPUEs and LPUEs.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 131-134. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information, such as predetermined noise thresholds and positions and characteristics of wireless devices 131-134. The database may further store channel information, scheduling schemes and resource allocations for each of access nodes 110, 120 and wireless devices connected thereto, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 2:
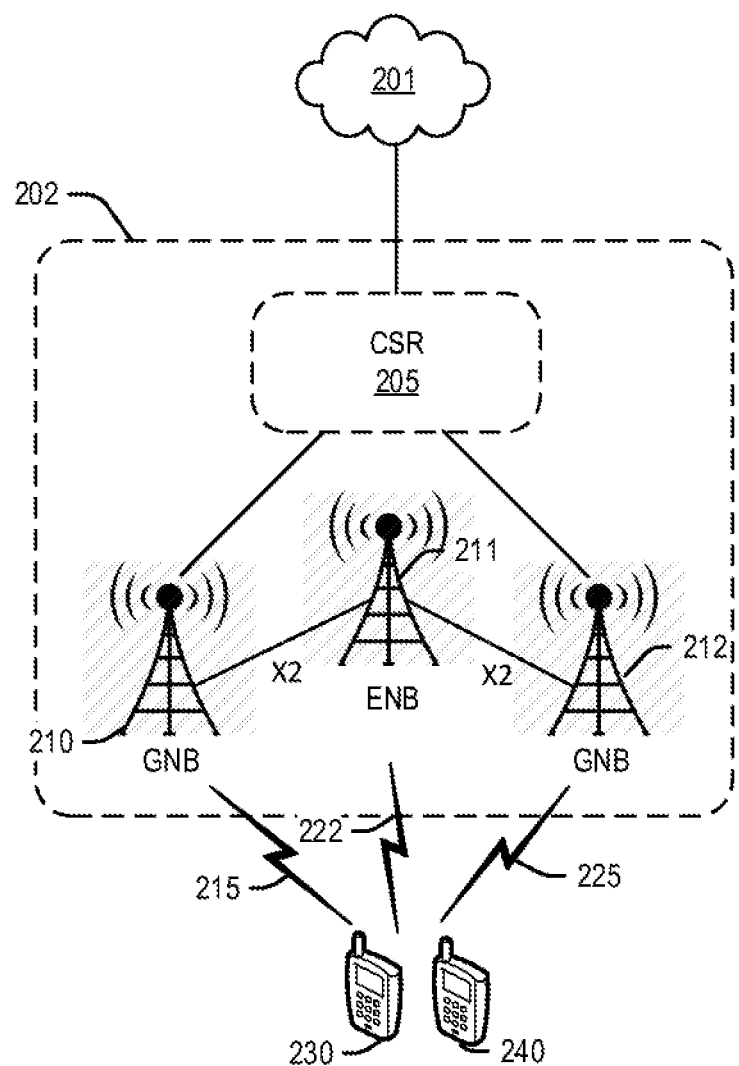
FIG. 2 illustrates an exemplary configuration of a 5G EN-DC radio access network.

FIG. 2 depicts an exemplary system 200 for E-UTRAN-NR Dual Connectivity (EN-DC) using 4G LTE and 5G NR. The access nodes 110 and 120 shown in FIG. 1 may utilize EN-DC using 4G LTE and 5G NR as shown. As shown in FIG. 1, the 4G LTE and 5G NR in a single node may be combined. System 200 includes a communication network 201, a radio access network 202, and wireless devices 230 and 240. Wireless device 230 may for example be an LPUE and wireless device 240 may, for example be an HPUE. Radio access network further includes at least a cell site router 205, and access nodes 210, 211, and 212.

In embodiments as set forth herein, access nodes 110 and 120 shown in FIG. 1, may include all of nodes 210, 211, and 212 and may include additional nodes. Cell site router 205 can include any network node that is configured to route incoming data packets from network 201 to wireless devices 230 and 240 via access node(s) 210, 211, and 212 and to route outgoing data packets received from the wireless devices 230 and 240 via access node(s) 210, 211, and 212 to the network 201. Therefore, network 201 can include any combination of networks, including a core network, intermediate/backhaul network, or packet data network (PDN). Persons having ordinary skill in the art may note that although only access nodes 210, 211, and 212, cell site router 205, and network 201 are illustrated in FIG. 2, other components such as gateways, controller nodes, user plane functions, etc. may be included as well.

In this exemplary embodiment, access node 210 can include a gNodeB, access node 211 can include an eNodeB, and access node 212 can include a gNodeB. In embodiments set forth herein, the access node 211 may be a master node and nodes 210 and 212 can operate as secondary nodes. In this one-to-many configuration, the eNodeB 211 is designated as the master node for wireless devices that can assign the wireless devices to the secondary nodes 210 and 212, which are illustrated as gNodeBs. For example, access node 211 deploys a first wireless air interface 222 using a first RAT, e.g., 4G LTE. Access node 210 can be configured to deploy a wireless interface 215 using a second RAT, e.g. 5G NR. Access node 212 deploys a wireless air interface 225, which can also utilize a 5G NR RAT. Each RAT can be configured to utilize a different frequency band or sub-band, a different channel size or bandwidth, and so on. For example, the 5G NR wireless interfaces 215 and 225 can be configured to utilize higher frequencies and larger channel bandwidths than the 4G LTE wireless interface 215. Further, the wireless devices 230, 240 can be configured to communicate using both RATs at the same time. For example, dual connections can be set up with one or both of the wireless devices 230 and 240 using both 4G and 5G air interfaces respectively, the 4G wireless interface 222 being used to transmit control information, and one of the 5G wireless interfaces (e.g. 5G interface 215) being used to transmit data information. For example, a processing node communicatively coupled to access node 211 can be configured to determine whether or not the wireless devices 230 and 240 are capable of communicating using both RATs (e.g. capable of 5G EN-DC) and further whether the wireless devices are HPUEs or LPUEs, and instruct the access node 211 to broadcast an indicator in, for example, a system information message. Responsive to the indicator, the wireless devices 230 and 240 can attach to access node 211 which can use the 4G carrier to control and set up a dual connectivity session with the wireless devices 230, 240. Further, access node 211 can function as a master node and be configured to perform methods described herein to select one (or more) of access nodes 210, 212 as a secondary node for the wireless devices 230 and 240. Further, access nodes 210 and 212 (hereinafter "secondary nodes") can each be coupled to access node 210 (hereinafter "master node") via X2 communication links.

Further, a processing node communicatively coupled to any of access nodes 210, 211, 212 can be configured to allocate air interface resources to wireless devices 230 and 240 by determining a characteristic of the wireless device, such as whether the wireless devices 230, 240 are HPUEs or LPUEs.

Further, within radio access network 202, access nodes 210, 211, 212 can be coupled via a direct communication link 207, which can include an X2 communication link. Access nodes 210, 211, and 212 can communicate control and data information across X2 communication links. In an exemplary embodiment, access node 211 includes logic to determine how to allocate data packets between access node 211 and the secondary access nodes 210, 212, wherein the data packets flow between wireless devices 230 and 240 and a network node on network 201 via CSR 205. Such logic may include a packet data convergence protocol (PDCP) function. Thus, RAN 202 can include a plurality of antenna elements (not shown herein) coupled to access nodes 210, 211, 212, with different antenna elements configured to deploy a different radio air interface using a different frequency. For example, each antenna element can be configured to deploy a 4G LTE air interface 222 or a 5G NR air interface 215, 225. Different quantities of antenna elements can be configured to deploy (or "assigned" to) a different type of air interface 215, 222, 225, depending on the needs of a network operator or users. Further, in split mode or "concurrent mode", individual antenna elements can be configured to simultaneously deploy at least two different air interfaces 215, 222, which enables wireless devices 230, 240 to transmit uplink data via two air interfaces selected from 215, 222, and 225 simultaneously. In an exemplary embodiment, the eNodeB portion 211 of RAN 202 is configured with logic to determine a transmission path for data packets traversing RAN 202. The transmission paths can traverse different RAT air interfaces 215, 22, 225, as well as different ports of CSR 205.

The one-to-many configuration illustrated in FIG. 2 allows a master node 211 to manage connections to multiple secondary nodes 210, 212. The management of the multiple secondary nodes can cause a reverse noise rise at the secondary nodes. Some secondary nodes 210, 212 may have low reverse noise levels, measured for example by RSRP, such as, for example, −105 dbm, versus others that have a higher reverse noise of, for example at −85 dbm. The reverse noise level at a particular secondary node may be based on the aggregation of transmit power of the UEs attached to it.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 and/or RAN 202 may be, comprise, or include computers systems and/or processing nodes. This includes, but is not limited to: access nodes 110, 120, 210, 211, 212, controller node 104, and/or network 101.

Figure 3:
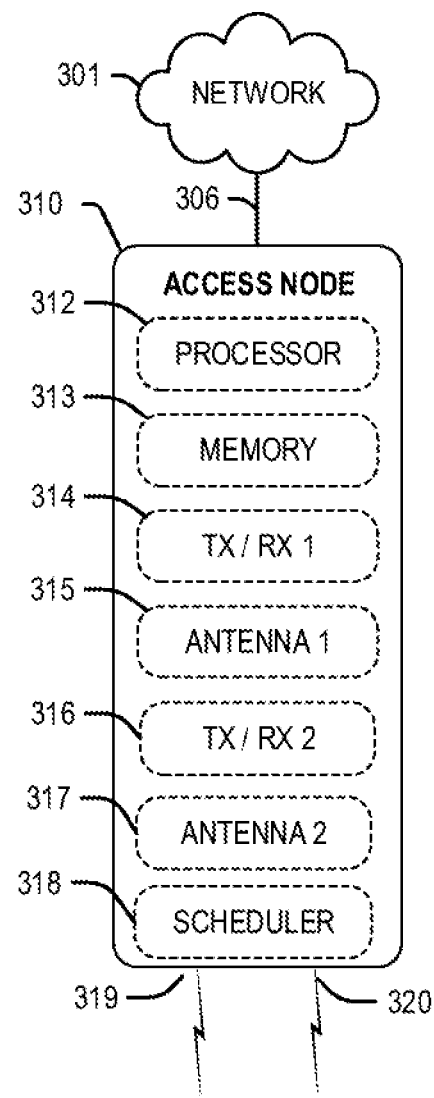
FIG. 3 depicts an access node in accordance with disclosed embodiments.

FIG. 3 depicts an exemplary access node 310. Access node 310 may comprise, for example, a macro-cell access node, such as access node 310 described with reference to FIG. 1. Access node 310 is illustrated as comprising a processor 312, memory 313, transceiver TX/RX 1 314, and antenna 1 315, transceiver TX/RX 2 316, antenna 2, 317, and scheduler 318. The first transceiver 314 and antenna 315 may be provided for deploying a radio air interface utilizing a first frequency band or first channel, and the second transceiver 316 and antenna 317 may deploy a radio air interface utilizing a second frequency band or second transmission channel. Two pairs of transceivers and antennae are illustrated herein solely to simplify the written description, and it may be evident to those having ordinary skill in the art, that any combination of transceivers and antennae may be incorporated in order to deploy carriers of multiple frequencies, formed beams, MU-MIMO data streams, and/or to facilitate communication with other network nodes on network 301. Processor 312 executes instructions stored on memory 313, while transceivers 314 and 316 and antennas 315 and 317 enable wireless communication with other network nodes, such as wireless devices and other nodes. For example, access node 310 may be configured to identify wireless device characteristics, evaluate a noise level in a sector, determine reverse noise or CRP at each secondary node, evaluate spectral efficiency of each channel, and assign the wireless devices to a secondary node based on these factors. Scheduler 318 may be provided for scheduling resources based on the presence of the wireless devices. These features may be enabled by access node 310 comprising two co-located cells, or antenna/transceiver combinations that are mounted on the same structure. Network 301 may be similar to network 101 discussed above. The wireless devices may operate in carrier aggregation mode, during which a wireless device utilizes more than one carrier, enabling the wireless devices to communicate with access node 310 using a combination of resources from multiple carriers.

Figure 5:
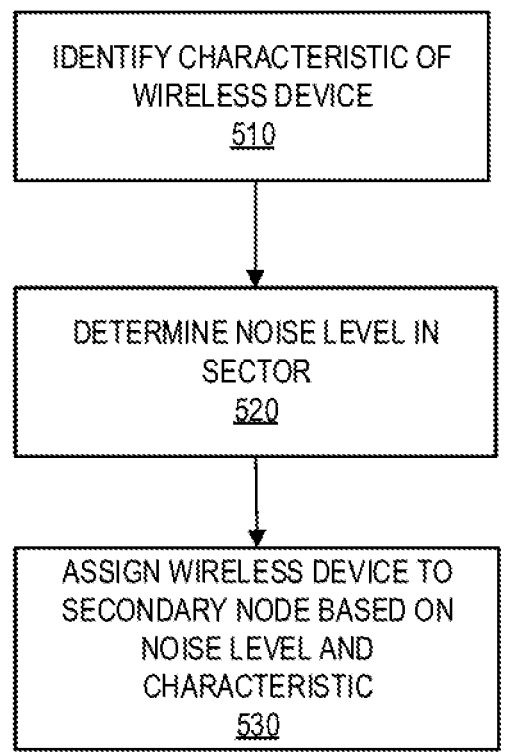
FIG. 5 depicts an exemplary method for assigning a wireless device to a secondary node based on a noise level and characteristics of the wireless device in accordance with disclosed embodiments.

Further, instructions stored on memory 313 can include instructions for dynamically assigning a wireless device to a secondary node, which will be further explained below with reference to FIGS. 5-7. The instructions may facilitate identifying characteristics of UEs, such as transmit power, identifying noise satisfying a predetermined threshold, identifying spectral efficiency of transmission channels, evaluating reverse noise at each secondary node, and assigning the UEs to a secondary node or transmission channel based on their characteristics.

Figure 4:
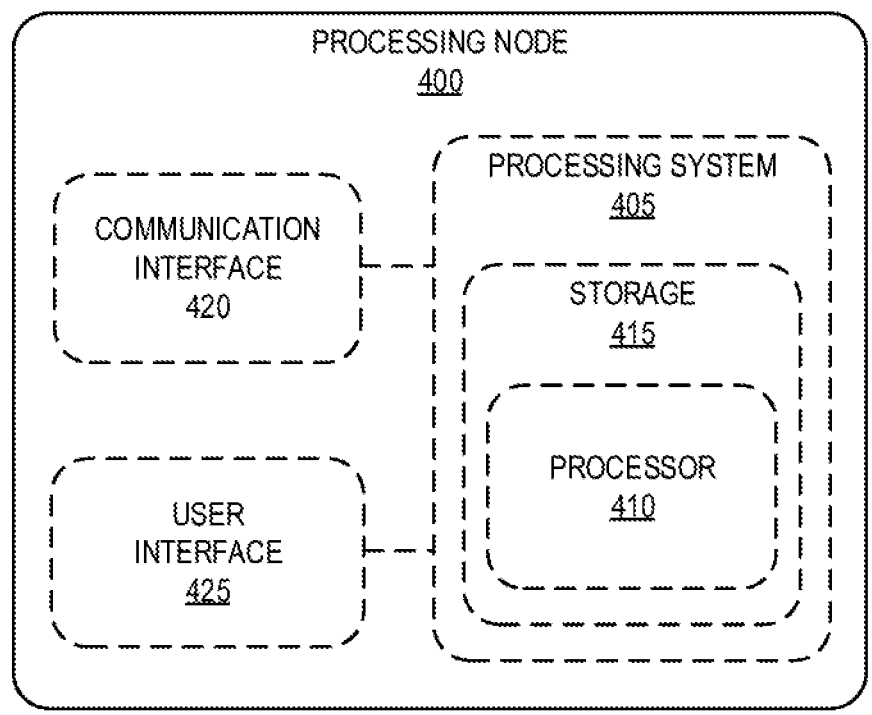
FIG. 4 depicts a processing node in accordance with the disclosed embodiments.

FIG. 4 depicts an exemplary processing node 400, which may be configured to perform the methods and operations disclosed herein for assigning wireless devices to a selected secondary node or transmission channel based on a noise level and the characteristics of the wireless device. In some embodiments, processing node 400 may be included in an access node, such as access node 110, 120, 210, 211, 212, or 310. In further embodiments, processing node 400 may be included in controller node 104 and may be configured for controlling the access nodes.

Processing node 400 may be configured for performing wireless device assignment by assigning wireless devices to a secondary node and/or transmission channel based on wireless device characteristics. The assignment may occur dynamically in real time based on an identification of a wireless device characteristic, such as a whether the wireless device is an HPUE or LPUE. Processing node 400 may include a processing system 405. Processing system 405 may include a processor 410 and a storage device 415. Storage device 415 may include a disk drive, a flash drive, a memory, or other storage device configured to store data and/or computer readable instructions or codes (e.g., software). The computer executable instructions or codes maybe accessed and executed by processor 410 to perform various methods disclosed herein. Software stored in storage device 415 may include computer programs, firmware, or other form of machine-readable instructions, including an operating system, utilities, drivers, network interfaces, applications, or other type of software. For example, software stored in storage device 415 may include a module for performing various operations described herein. Processor 410 may be a microprocessor and may include hardware circuitry and/or embedded codes configured to retrieve and execute software stored in storage device 415.

Processing node 400 may include a communication interface 420 and a user interface 425. Communication interface 420 may be configured to enable the processing system 405 to communicate with other components, nodes, or devices in the wireless network. Communication interface 420 may include hardware components, such as network communication ports, devices, routers, wires, antenna, transceivers, etc. User interface 425 may be configured to allow a user to provide input to processing node 400 and receive data or information from processing node 400. User interface 425 may include hardware components, such as touch screens, buttons, displays, speakers, etc. Processing node 400 may further include other components such as a power management unit, a control interface unit, etc.

The disclosed methods for assigning wireless devices to secondary nodes based on and wireless device characteristics and a noise level in the sector are further discussed with reference to FIGS. 5-7. FIG. 5 illustrates an exemplary method 500 for assignment of wireless device to a secondary node or transmission channel. The method may occur in dynamically in real time or at predetermined intervals. Method 500 may be performed by any suitable processor discussed herein, for example, a processor included in access node 110, 120, 210-212, or 312, processor 410 included in processing node 400, or a processor included in controller node 104. For discussion purposes, as an example, method 500 is described as being performed by a processor included in access node 110.

Method 500 starts in step 510 when the access node identifies a characteristic of a wireless device. In embodiments set forth herein, the access node determines of the wireless device is an HPUE or an LPUE device. As set forth above, the identification may be made based on numerous methods including communications received at the access node from the wireless device. For example, the HPUEs and LPUES can use a UE CAPABILITY message to indicate (or report) at to the access node that an HPUE is a power class 2 UE and/or wireless device that corresponds to a Power of +26 dBm (illustrated in Table 1) with a nominal power tolerance (i.e., power error limit) of ±2 dB (e.g., for E-UTRA bands). In addition, HPUEs or LPUEs can use power headroom report (PHR) and/or enhanced PHR (ePHR) message(s) to report a current transmit power state (e.g., how much power the HPUEs or LPUEs required in a previous subframe structure) to the AN. Alternatively, in another exemplary embodiment, HPUEs and LPUEs can be configured with a chipset type or version, which may be provided to the access node by the HPUEs or LPUEs during an ATTACH PROCEDURE. Other methods of communicating whether the UE is a HPUE or LPUE may be used in conjunction with the disclosed embodiments. Accordingly, a processor or processing node may determine if a wireless device is interacting with the access node is an HPUE or an LPUE.

In step 520, the access node determines a noise level in the sector. The noise level may include an aggregate noise level based on reports from UEs and/or secondary nodes to the master node. For example, the UEs may report RSSI, SINR, RSSP or other measurements. Channel received power, reverse noise, reverse link noise rise, or uplink interference levels may be measured at each secondary node. These measurements may only be evaluated as noise when they exceed a predetermined threshold, which may be configurable based on the particular network. The noise can be created for many reasons, for example, by external nodes transmitting at a high power, by HPUEs transmitting at a high power from the cell edge, or simply by an excessive load on the network created by a large number of UEs transmitting.

In exemplary embodiments, the access node determines the channel received power at all of the access nodes and determines an aggregate or average channel received power. The access node may also determine channel received power at each secondary node and identify the secondary nodes having the highest and lowest channel received power. Some secondary nodes have low received noise levels (RSRP), such as, for example, −105 dbm, versus others that have a relatively higher RSRP at −85 dbm. These values are based on the aggregation of transmit power of the UEs attached to it as well as to external interference power. Generally, each secondary node will experience a different reverse noise level.

In additional embodiments, the access node may detect a threshold number of devices in the sector or a threshold number of HPUEs. The access node may additionally or alternatively detect SNR or SINR or RSSI. These detections and measurements may be made dynamically by UEs and reported to the master node or secondary nodes. Alternatively, detections and measurements may be made by secondary nodes and reported to the master node.

In step 530, the access node assigns the wireless device to a secondary node based on the noise level and the characteristic of the wireless device. For example, in embodiments set forth herein, the access node may assign HPUEs to the secondary node having a highest channel received power and may assign LPUEs to the secondary node having the lowest channel received power. As set forth above, different nodes may experience different channel received power or reverse noise, for example, negative 110 dbm 90 dbm, M85 dbm. In exemplary embodiments, the HPUEs would be assigned to the secondary node having the negative M85 dbm. With high interference or noise in the sector, advantages are created by transmitting at higher power uplink power utilized by HPUEs. LPUEs would be challenged to effectively transmit to the secondary nodes experiencing high noise. Thus, as network conditions deteriorate, the UEs having the stronger signal transmission characteristics, i.e., HPUEs, are likely to be able to continue to transmit in higher noise environments, thereby improving overall network performance.

In further embodiments, because the secondary nodes transmit using different frequency bands and/or channels, the access node may identify a channel having a highest spectral efficiency and assign the HPUE to the secondary node using the transmission channel having the highest spectral efficiency. LPUEs may be assigned to secondary nodes have a lower or the lowest spectral efficiency. As a result of the assignment, the HPUE will attach to the secondary node transmitting over a channel having the highest spectral efficiency. Maximum information can be transmitted over channels having high spectral efficiency, thereby achieving high throughput. Thus, the spectral efficiency describes a rate of information being transmitted over a given bandwidth in the communications system. The assignment of the wireless device to a secondary node utilizing a highest spectral efficiency will ensure the HPUEs that are contributing towards the high noise are able to transmit more data in a short period of time, thus reducing the overall noise impact on the access nodes.

The assignment of the wireless device to the secondary nodes may be accomplished, for example, by an instruction sent by the access node, such as the master node, to the wireless device for example by utilizing an RRC connection reconfiguration message or another message or indicator directed specifically to the wireless device.

Figure 6:
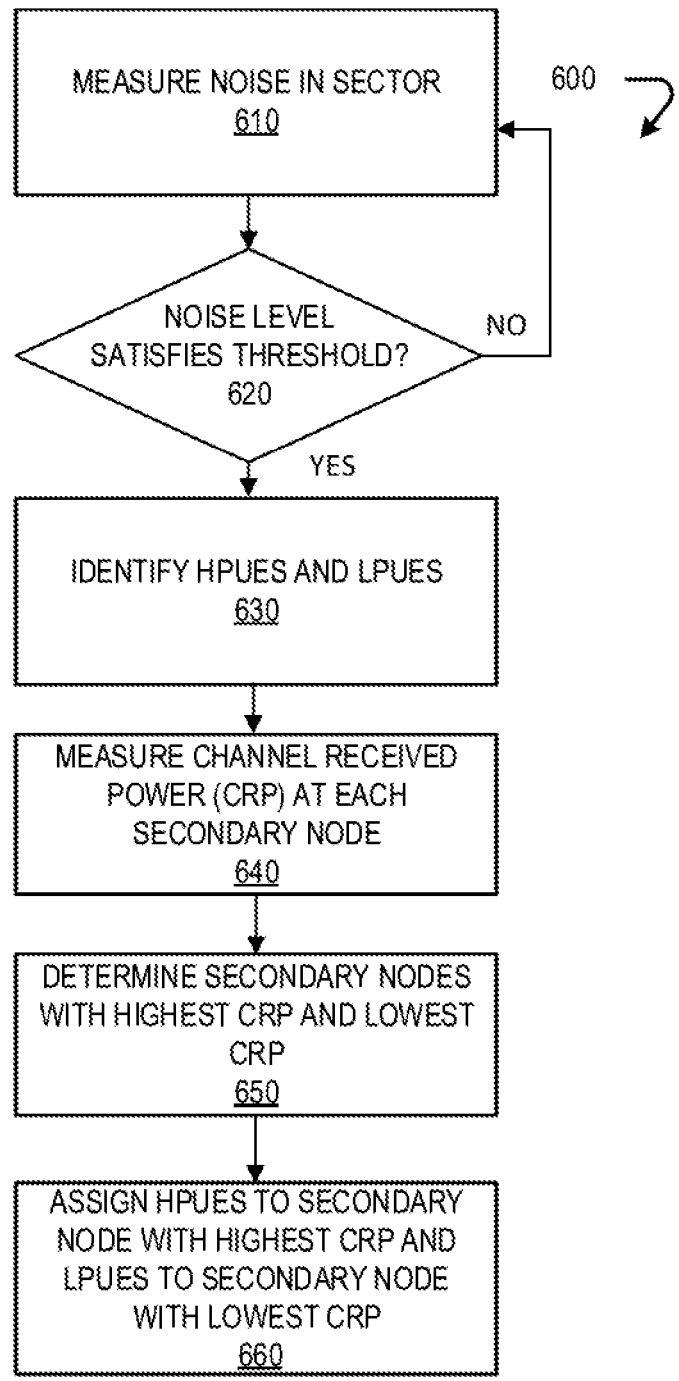
FIG. 6 depicts another exemplary method for assigning wireless devices to a secondary node in accordance with disclosed embodiments.

The method of FIG. 6 illustrates a method 600 for dynamic assignment of UEs to a secondary node based on characteristics of the UE, noise within the sector, and characteristics of the secondary nodes. Method 600 may be performed by any suitable processor discussed herein, for example, a processor included in access node 110, 120, 210-212 or 312, processor 410 included in processing node 400, or a processor included in controller node 104. For discussion purposes, as an example, method 600 is described as being performed by a processor included in access node 110.

In step 610, measures the noise in its sector. Because high channel received power indicates noise, channel received power may be reported by the secondary nodes to the access node. Other measurements can be made, such as reverse link noise rise, uplink channel received power, or uplink interference level. These measurements are indicative of noise when they satisfy a predetermined threshold. The threshold may be configurable based on network characteristics. As set forth above, multiple sources of noise may be present such as a large number of secondary nodes, a large number of wireless devices, particularly HPUEs transmitting at a high power, UEs transmitting at a cell edge, or external node interference. Measurements may be reported by wireless devices or by secondary nodes to the master node. The master node may combine measurements to arrive at a noise level.

In step 620, the access node determines if the noise level satisfies a threshold. The threshold may be a predetermined threshold stored for example in the database 105. If the noise level satisfies the threshold, i.e., is sufficiently high, the access node, which is preferably a master node, continues to perform the method described herein. The threshold may be multi-faceted and may include a threshold for total loading on the sector in terms or noise as well as a total number of HPUEs and LPUEs. When the threshold is met, the method proceeds to step 630. However, if the noise level in the sector is not sufficiently high, the access node may return to step 610 to continue to measure the noise in the sector.

When the threshold is satisfied, the access node identifies a characteristic of the wireless device in step 630. In embodiments set forth herein, the access node may determine, for example, a transmit power of the wireless device, a chipset of the wireless device, or PHR of the wireless device. The determination may be made at the master node, for example, based on notifications sent by the wireless devices or secondary nodes to the access node using any of the methods set forth above with respect to step 510 in FIG. 5 or by any other known methods. Thus, in exemplary embodiments, the access node determines if the wireless device is an HPUE or LPUE.

In step 640, the access node or master node measures reverse noise or channel received power at each secondary node. Some secondary nodes may have low receive noise levels (RSRP), such as −105 dbm, versus others with higher levels such as −85 dbm, caused by the aggregation of transmit power of the UEs attached to the respective node. In step 650, the access node may determine the secondary nodes with the highest and lowest reverse noise level. For example, −105 dbm may be the lowest reverse noise level and −85 dbm may be the highest reverse noise level. It should be noted that secondary nodes having a particularly high noise level may not be able to decode packets from LPUEs.

In step 660, the access node assigns the HPUEs to the secondary node having the highest reverse noise level and assigns the LPUEs to the secondary node having the lowest reverse noise levels. At nodes with high reverse noise levels, the LPUEs may not be heard by the secondary node due to the extra noise. Thus, the assignment of the HPUEs to the secondary node with the highest reverse noise level ensures that the UEs connected to that particular secondary node will be able to transmit to the node despite the noise. An assignment instruction may be sent by the access node to the wireless device for example by utilizing an RRC connection reconfiguration message or another message directed specifically to the wireless device. Thus, as network conditions deteriorate, the UEs having the stronger signal transmission characteristics, i.e., HPUEs are likely to be able to continue to transmit.

Figure 7:
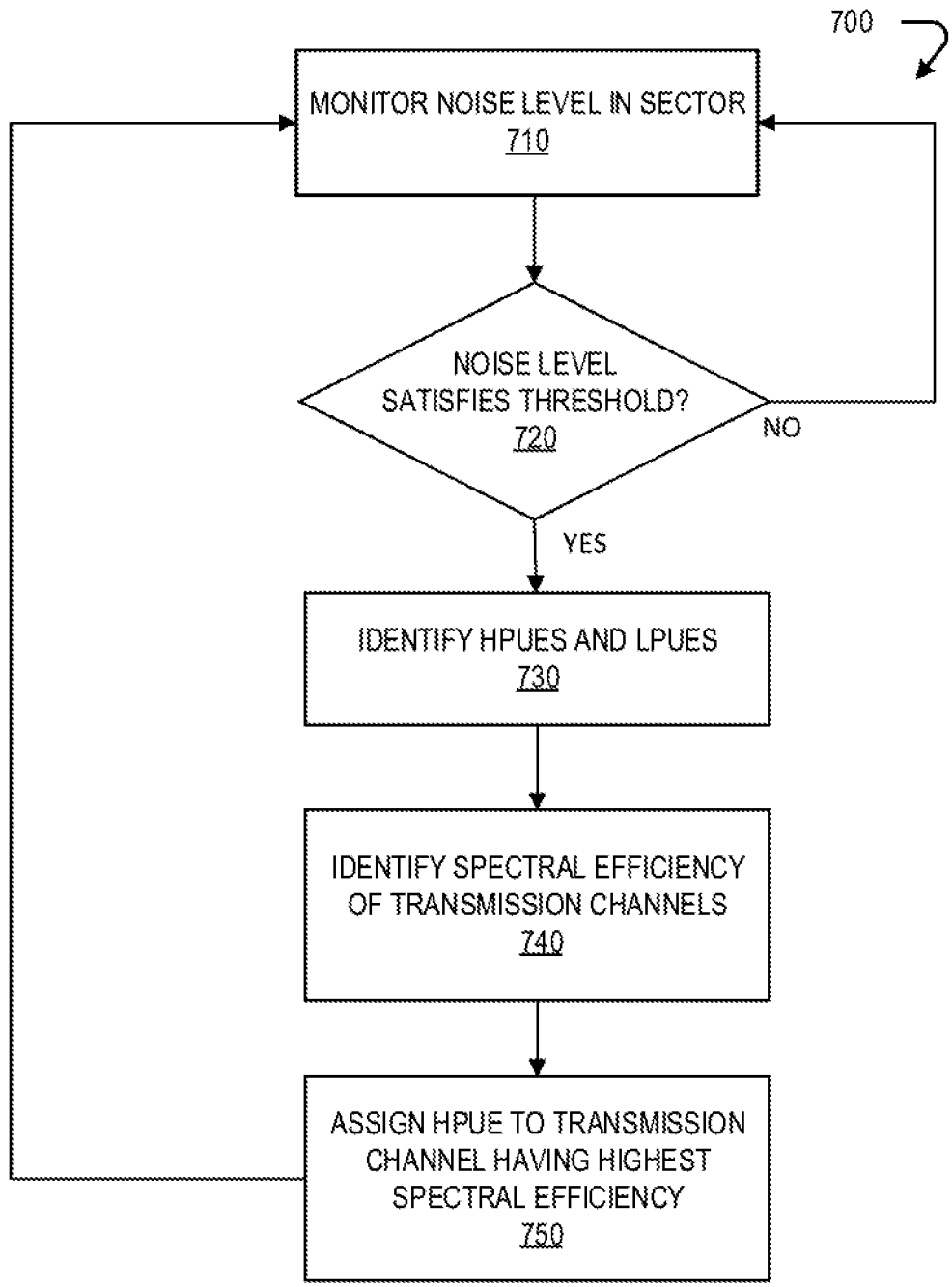
FIG. 7 depicts another exemplary method for assigning wireless devices to a secondary node in accordance with disclosed embodiments.

The method of FIG. 7 illustrates a method 700 for dynamic assignment of UEs to a transmission channel or secondary node based on characteristics of the UE and characteristics of the secondary node. Method 700 may be performed by any suitable processor discussed herein, for example, a processor included in access node 110, 120, 210-212, 220, or 312, processor 410 included in processing node 400, or a processor included in controller node 104. For discussion purposes, as an example, method 700 is described as being performed by a processor included in access node 110.

In step 710, the access node monitors a noise level in the sector. The noise level may, for example be measure by RSSI. The total RSSI may include power from the access nodes and at the secondary nodes from the wireless devices, from external devices, from adjacent interference, etc. Also, because high channel received power indicates noise, channel received power may be reported by the secondary nodes to the access node. Other measurements can be made, such as reverse link noise rise, uplink channel received power, or uplink interference level. These measurements are indicative of noise when they satisfy a predetermined threshold. The threshold may be configurable based on network characteristics. As set forth above, multiple sources of noise may be present such as a large number of secondary nodes, a large number of wireless devices, particularly HPUEs transmitting at a high power, UEs transmitting at a cell edge, or external node interference. Measurements may be reported by wireless devices or by secondary nodes to the master node. The master node may combine measurements to arrive at a noise level.

In step 720, the access node determines if the noise level satisfies a predetermined threshold. The threshold may be a predetermined threshold stored for example in the database 105. The threshold may be a predetermined threshold stored for example in the database 105. If the noise level satisfies the threshold, i.e., is sufficiently high, the access node, which is preferably a master node, continues to perform the method described herein. The threshold may be multi-faceted and may include a threshold for total loading on the sector in terms or noise as well as a total number of HPUEs and LPUEs. When the threshold is met, the method proceeds to step 730. However, if the noise level in the sector is not sufficiently high, the access node may return to step 710 to continue to measure the noise in the sector.

In step 730, the access node determines a characteristic of the wireless device and more specifically determines whether the device is an HPUE or an LPUE. In embodiments set forth herein, the access node may determine, for example, a transmit power of the wireless device, a chipset of the wireless device, or PHR of the wireless device. The determination may be made at the access node, for example, based on notifications sent by the wireless device to the access node using any of the methods set forth above with respect to step 510 in FIG. 5.

In step 740, the access node identifies the spectral efficiency of secondary node transmission channels. Spectral efficiency refers to the information rate that can be transmitted over a given bandwidth in a specific communication system. System spectral efficiency measures of the quantity of users or services that can be simultaneously supported by a limited radio frequency bandwidth in a defined geographic area. The master node in step 740 may also identify a channel having a highest spectral efficiency and a channel having a lowest spectral efficiency. The channels are utilized by one or more secondary nodes and thus, the master node, by assigning the wireless device to a channel, also assigns the wireless device to a particular secondary node.

In step 750, the access node may assign the HPUEs to a transmission channel having the highest spectral efficiency.

Further the access node may assign LPUEs to a transmission channel and secondary node having a lower spectral efficiency. Because the HPUEs are able to transmit quickly over channels having high spectral efficiency, the noise in the sector will decrease and the LPUEs will be able to transmit when the noise decreases.

In some embodiments, methods 500, 600, and 700 may include additional steps or operations. Furthermore, the methods may include steps shown in each of the other methods. As one of ordinary skill in the art would understand, the methods 500, 600, and 700 may be integrated in any useful manner. Additionally, in order to optimize a heterogeneous network, the methods disclosed may be performed for multiple devices in the network so that the wireless devices can be appropriately assigned.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for assigning a wireless device to one of multiple secondary nodes, the method comprising:
   identifying a characteristic of a wireless device in a sector;
   classifying the wireless device as high power user equipment (HPUE) based on the characteristic;
   determining a noise level in the sector;
   determining that the noise level in the sector satisfies a threshold;
   identifying a spectral efficiency of multiple channels used by the multiple secondary nodes;
   selecting one channel having a highest spectral efficiency; and
   assigning the HPUE to the selected one channel of one of the multiple secondary nodes having a highest spectral efficiency when the noise level satisfies the threshold.

2. The method of claim 1, further comprising measuring the noise level in the sector by determining a channel received power at the multiple secondary nodes.

3. The method of claim 2, further comprising selecting one secondary node having a highest noise level and assigning the HPUE to the selected one secondary node.

4. The method of claim 2, further comprising classifying another wireless device as low power user equipment (LPUE) and selecting another secondary node having a lowest noise level and assigning the LPUE to the selected another secondary node.

5. The method of claim 1, further comprising selecting another channel having a lowest spectral efficiency.

6. The method of claim 1, wherein the noise level is measured by a received signal strength indicator (RSSI).

7. A system comprising:
   at least one master node and multiple secondary nodes;
   a processor coupled to the master node configured to perform operations comprising,
   identifying a power class for multiple wireless devices in a sector, and classifying one of the multiple wireless devices as high-power class user equipment (HPUE) and classifying another of the multiple wireless devices as low power class user equipment (LPUE);
   determining a noise level at the multiple secondary nodes in the sector by determining a channel received power at the multiple secondary nodes; and
   assigning the multiple wireless devices to one of the secondary nodes based on the power class and the noise level in the sector by selecting one secondary node having a highest noise level and assigning the HPUE to the selected one secondary node and selecting another secondary node having a lowest noise level and assigning the LPUE to the selected another secondary node.

8. The system of claim 7, the operations further comprising determining if the noise level at the multiple secondary nodes satisfies a threshold.

9. The system of claim 8, further comprising identifying a spectral efficiency of multiple channels used by the secondary nodes.

10. The system of claim 9, further comprising selecting one channel having a highest spectral efficiency and another channel having a lowest spectral efficiency and assigning the HPUE to the selected one channel having a highest spectral efficiency when the noise level satisfies the threshold.

11. The system of claim 8, wherein the noise level is measured by a received signal strength indicator (RSSI).

12. A processing node utilizing a processor performing configured to perform operations comprising:
   identifying a power class for at least one wireless device in a sector, and classifying the wireless device high-power class user equipment (HPUE);
   determining a noise level in the sector exceeds a predetermined threshold; and
   assigning the HPUE to a channel based on a channel spectral efficiency when the noise level satisfies the predetermined threshold by assigning the HPUE to a highest spectral efficiency channel serving the sector.

13. The processing node of claim 12, the operations further comprising determining channel received power at multiple secondary nodes and assigning the HPUE to one of the secondary nodes having a highest channel received power; classifying another wireless device as low-power user equipment (LPUE) and assigning the LPUE to another of the secondary nodes having a lowest channel received power.

\* \* \* \* \*